(12) United States Patent
Matsubara

(10) Patent No.: US 8,543,612 B2
(45) Date of Patent: Sep. 24, 2013

(54) MOBILE TERMINAL

(75) Inventor: Takashi Matsubara, Yokohama (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 674 days.

(21) Appl. No.: 12/048,469

(22) Filed: Mar. 14, 2008

(65) Prior Publication Data

US 2008/0301194 A1 Dec. 4, 2008

(30) Foreign Application Priority Data

May 31, 2007 (JP) .............................. P2007-145710

(51) Int. Cl.
*G06F 7/00* (2006.01)

(52) U.S. Cl.
USPC ........... 707/796; 707/913; 707/914; 707/915; 382/305

(58) Field of Classification Search
None
See application file for complete search history.

(56) References Cited

U.S. PATENT DOCUMENTS

| | | | | |
|---|---|---|---|---|
| 6,593,973 | B1 * | 7/2003 | Sullivan et al. | 348/584 |
| 6,631,403 | B1 * | 10/2003 | Deutsch et al. | 709/217 |
| 7,385,532 | B1 * | 6/2008 | Schumacher | 341/51 |
| 7,409,405 | B1 * | 8/2008 | Masinter et al. | 1/1 |
| 7,734,104 | B2 * | 6/2010 | Yamane et al. | 382/232 |
| 2004/0114818 | A1 * | 6/2004 | Makiyama et al. | 382/239 |
| 2006/0059174 | A1 * | 3/2006 | Mese et al. | 707/100 |
| 2008/0122971 | A1 * | 5/2008 | Xie | 348/385.1 |

FOREIGN PATENT DOCUMENTS

| | | |
|---|---|---|
| JP | 11-272572 A | 10/1999 |
| JP | 2000-115277 A | 4/2000 |
| JP | 2002-335354 A | 11/2002 |
| JP | 2005-167555 A | 6/2005 |
| JP | 2006-004391 A | 1/2006 |
| JP | 2006-094516 A | 4/2006 |

OTHER PUBLICATIONS

JP Office Action dated Mar. 13, 2012 as received in application No. 2007-145710.

* cited by examiner

*Primary Examiner* — Anh Tai Tran
(74) *Attorney, Agent, or Firm* — Maschoff Brennan

(57) ABSTRACT

According to an aspect of the invention, there is provided a mobile terminal including: a content file storage configured to store a plurality of contents and file types corresponding to the contents respectively; a plurality of processing module configured to execute processing according to coding methods respectively; a resource table configured to store first information identifying the multimedia resource and second information about what kind of file type can be executed by the multimedia resources and priority; and a control unit configured to detect the file type of a content file to be executed, and determine the processing module corresponding to the first information by comparing the second information stored in the resource table and the detected file type.

13 Claims, 7 Drawing Sheets

OPTIMUM RESOURCE SELECTING TABLE (17)

OPTIMUM RESOURCE SELECTING TABLE (17): CASE OF FIG. 2B SHOWN BELOW

| A KIND OF FILE | SOFTWARE | | HARDWARE |
|---|---|---|---|
| | JPEG CODEC FUNCTION 13 | PNG CODEC FUNCTION 14 | MULTIMEDIA CHIP 15 |
| JPEG (.jpg) | O PRIORITY 2 | X | O PRIORITY 1 |
| PNG (.png) | X | O | X |
| MOVING IMAGE (.3gp) | X | X | O |
| TERRESTRIAL DIGITAL BROADCASTING DATA (.ts) | X | X | O |

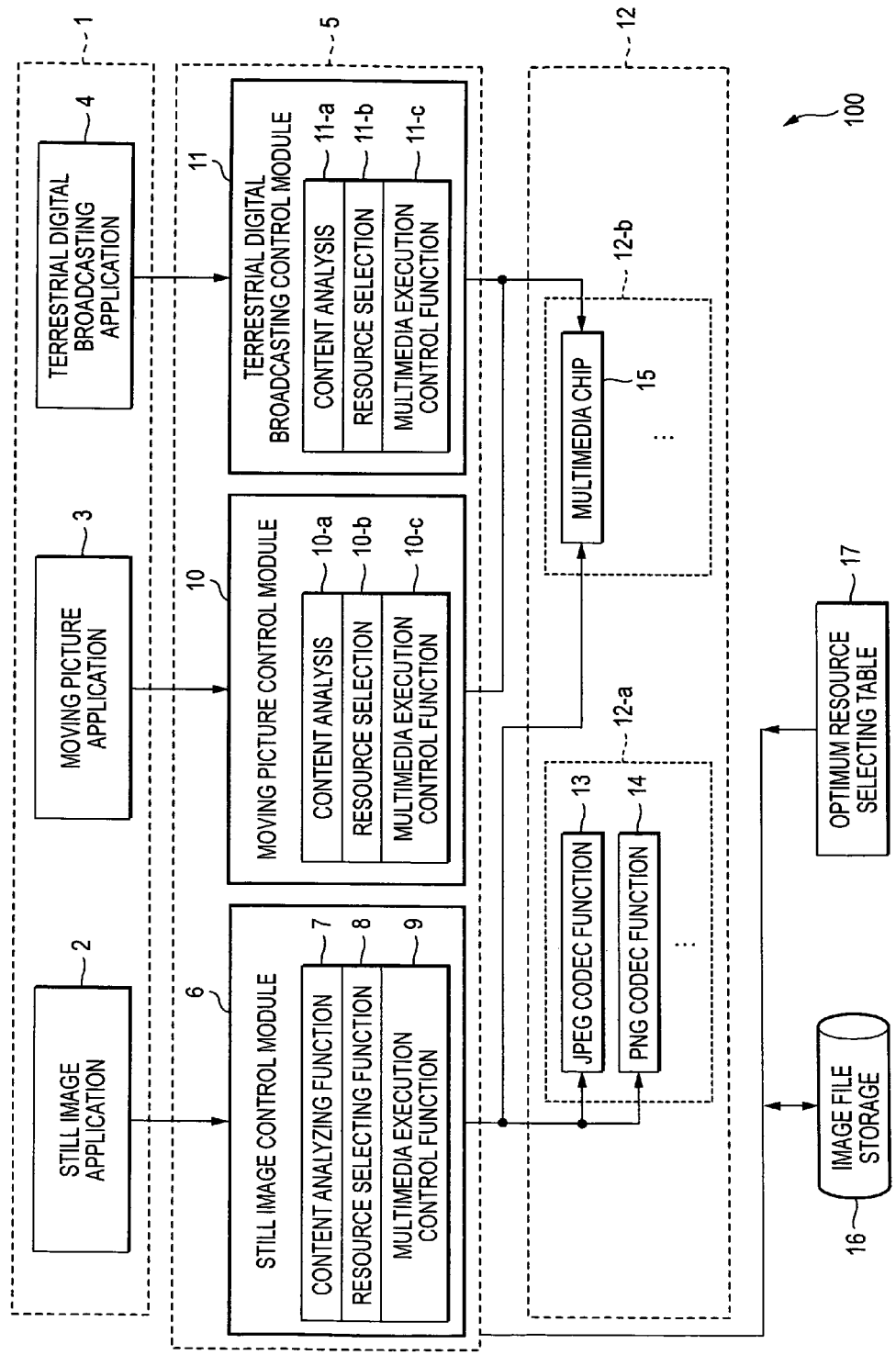

FIG. 2A

OPTIMUM RESOURCE SELECTING TABLE (17)

OPTIMUM RESOURCE SELECTING TABLE (17): CASE OF FIG. 2B SHOWN BELOW

| A KIND OF FILE | SOFTWARE | | HARDWARE |
|---|---|---|---|
| | JPEG CODEC FUNCTION 13 | PNG CODEC FUNCTION 14 | MULTIMEDIA CHIP 15 |
| JPEG (.jpg) | O PRIORITY 2 | X | O PRIORITY 1 |
| PNG (.png) | X | O | X |
| MOVING IMAGE (.3gp) | X | X | O |
| TERRESTRIAL DIGITAL BROADCASTING DATA (.ts) | X | X | O |

FIG. 2B

OPTIMUM RESOURCE IN JPEG DETERMINATION (1)

| | SOFTWARE | HARDWARE |
|---|---|---|
| | JPEG CODEC FUNCTION 13 | MULTIMEDIA CHIP 15 |
| PROCESSING SPEED | NORMAL | FAST |
| USED AMOUNT OF MEMORY | LARGE | SMALL |
| DETERMINATION | PRIORITY 2 | PRIORITY 1 |

FIG. 2C

OPTIMUM RESOURCE IN JPEG DETERMINATION (2)

| | SOFTWARE | HARDWARE |
|---|---|---|
| | JPEG CODEC FUNCTION 13 | MULTIMEDIA CHIP 15 |
| PROCESSING SPEED | FAST | NORMAL |
| USED AMOUNT OF MEMORY | LARGE | SMALL |
| DETERMINATION | PRIORITY 1 | PRIORITY 2 |

FIG. 3A

OPTIMUM RESOURCE SELECTING TABLE (17)
(OTHER EXAMPLE)

OPTIMUM RESOURCE SELECTING TABLE (17)

| A KIND OF FILE | COLOR FORMAT | SOFTWARE | | HARDWARE |
| --- | --- | --- | --- | --- |
| | | JPEG CODEC FUNCTION 13 | PNG CODEC FUNCTION 14 | MULTIMEDIA CHIP 15 |
| JPEG (.JPG) | GRAY IMAGE | O | X | X |
| | COLOR IMAGE | O PRIORITY 2 | X | O PRIORITY 1 |

FIG. 3B

JPEG FILE CONSTITUTION

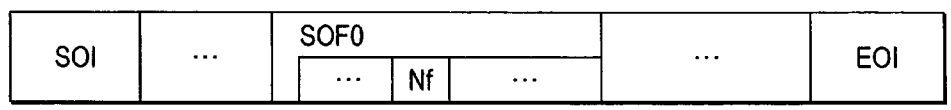

SOI: IMAGE START CODE
EOI: IMAGE FINISH CODE
SOF0: FRAME START CODE
Nf: IN-FRAME IMAGE COMPONENT NUMBER CODE

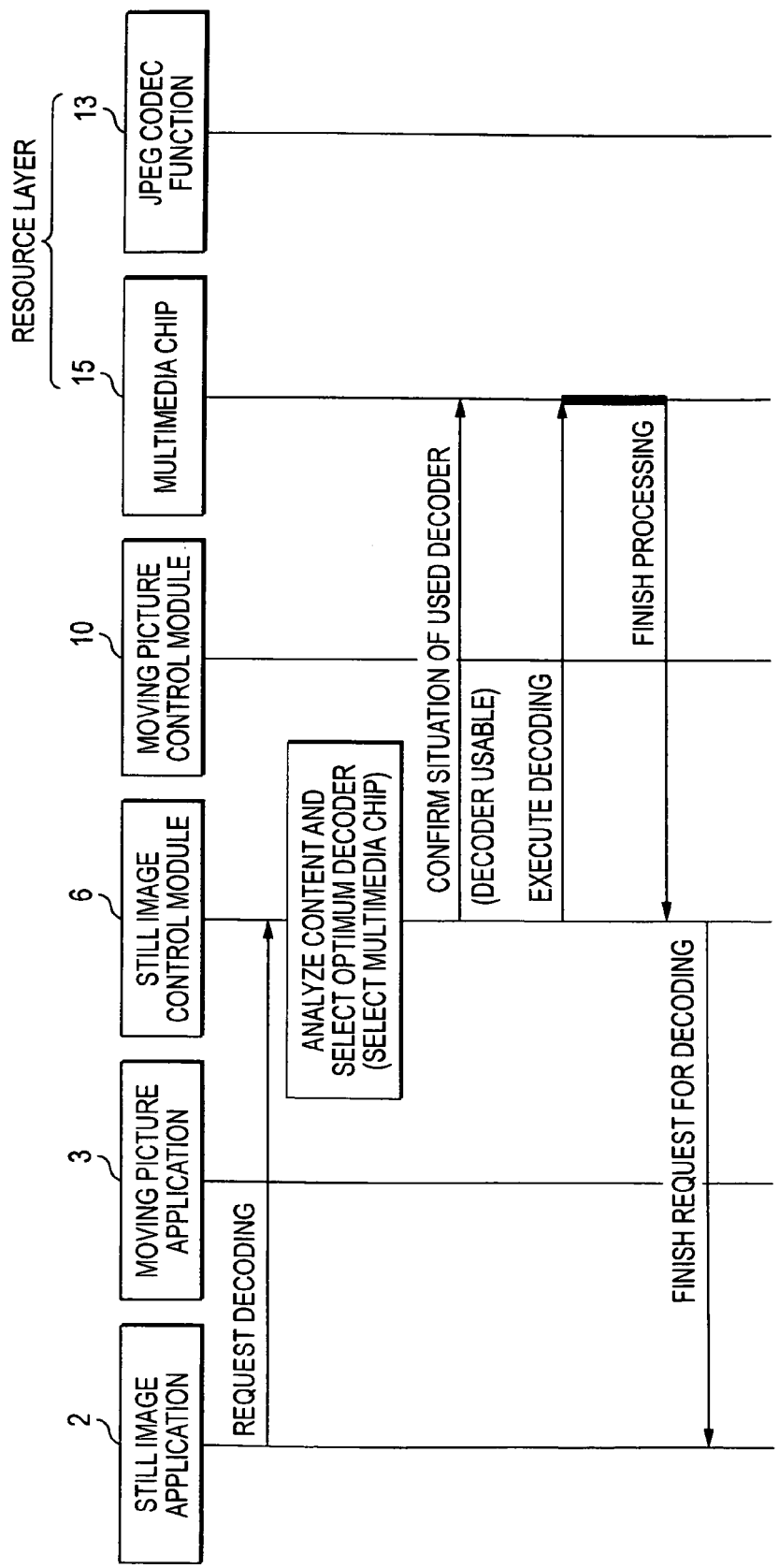

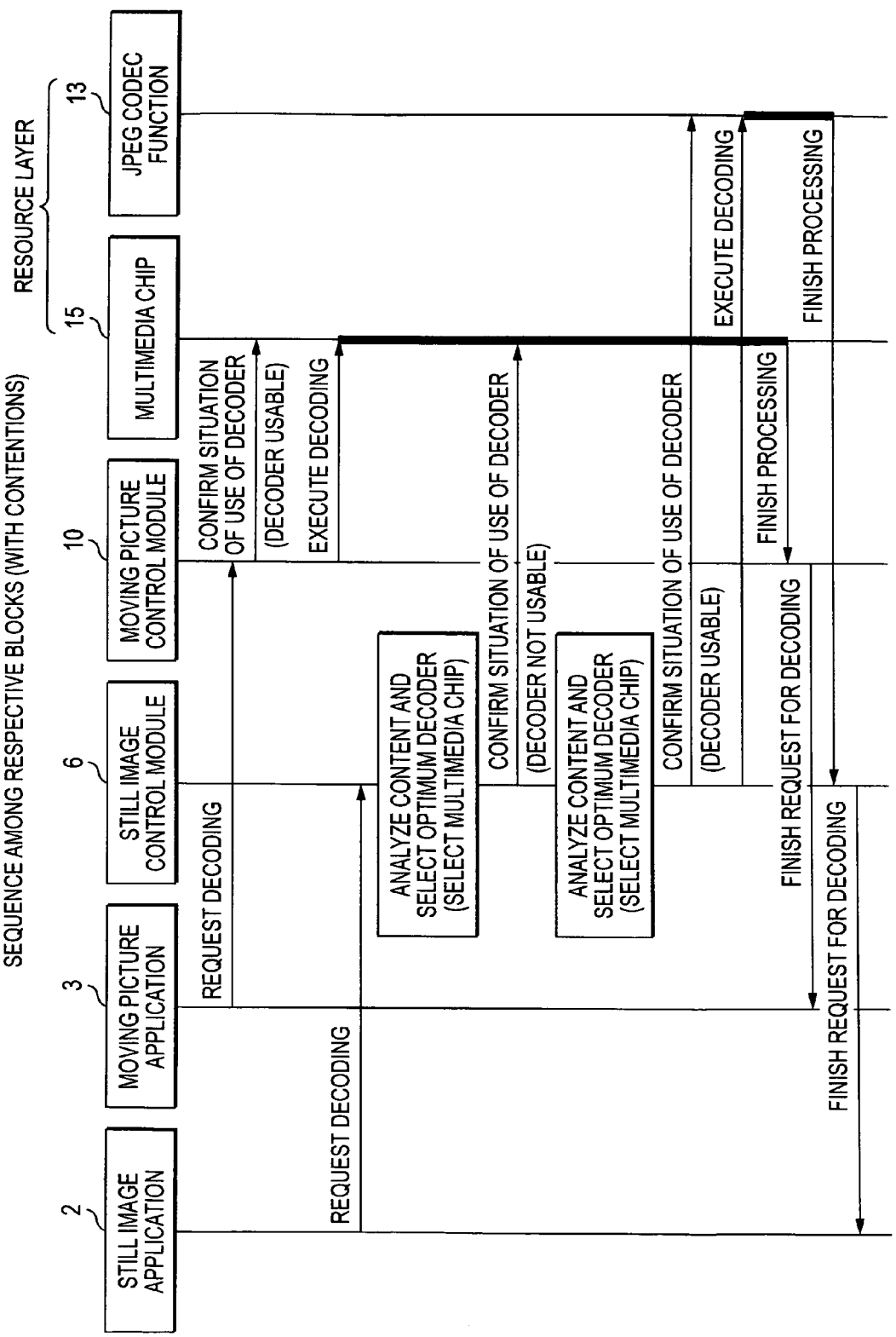

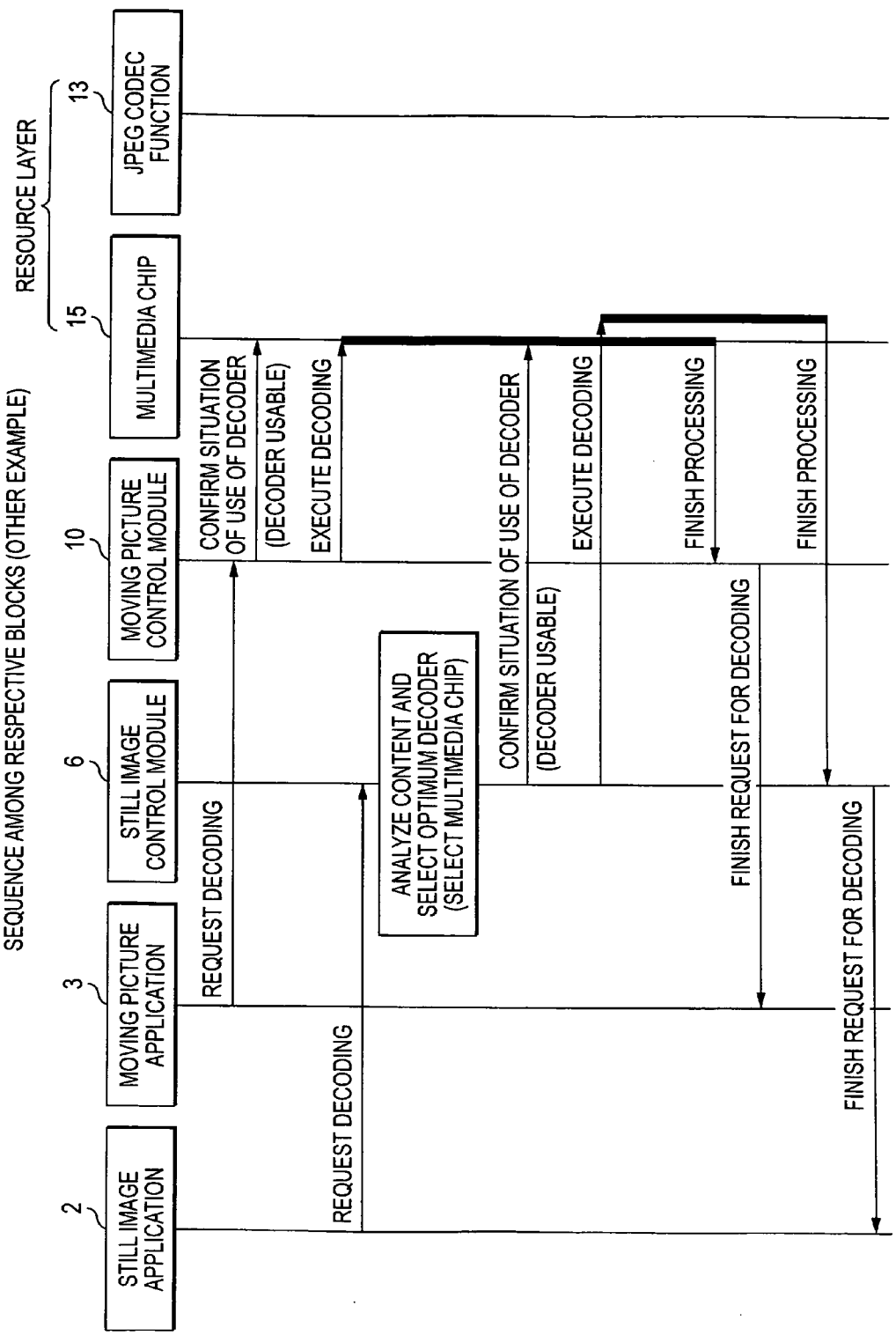

MOBILE TERMINAL

CROSS-REFERENCE TO RELATED APPLICATIONS

This application is based on and claims the benefit of priority from the prior Japanese Patent Application No. 2007-145710, filed on May 31, 2007; the entire contents of which are incorporated herein by reference.

BACKGROUND OF THE INVENTION

1. Field of the Invention

The present invention relates to a mobile terminal capable of executing multimedia contents by using a plurality of mounted multimedia resources such as chips (hardware modules) and software programs (software modules), wherein the mobile terminal select a suitable module to execute the multimedia content.

2. Description of the Related Art

In an image processing apparatus, there may occur a plurality of accesses to a resource such as image processor. In this case, the accesses need to be reconciled to execute the accesses smoothly.

For example, JP-A-2006-94516 discloses that an image processing apparatus has a function for avoiding collision of a plurality of accesses to resources such as an image processor. The image processing apparatus is provided with a copy mode, a scan mode, a printer mode, and a net ready image processing mode for executing an image processing with regard to a single media, for example still image, by the respective modes. For example, referring to paragraph [0024] and FIG. 14, it is described on how the image processing is handled, when an interruption based on a net ready image processing is occurred while the image processing is running in copy mode. When the image processing regarding the copy operation mode and the image processing regarding the net ready image processing mode are contended, the image processing regarding the copy mode is executed by a hardware resource, for example image processing portion 12, and the image processing regarding the net ready image processing mode is executed by an software resource, for example operating portion 31. Therefore, when the accesses to the resource are contended, the image processing apparatus executes the respective image processings in parallel.

On the other hand, recent mobile terminal such as a cellular phone has a plurality of functions, for example still image processing, moving image processing, terrestrial broadcast processing, and the like, therefore, it needs to be considered on which one of the hardware resource and the software resource should be used when the collision occurs.

BRIEF SUMMARY OF THE INVENTION

According to an aspect of the invention, there is provided a mobile terminal including: a content file storage configured to store a plurality of contents and file types corresponding to the contents respectively; a plurality of processing module configured to execute processing according to coding methods respectively; a resource table configured to store first information identifying the multimedia resource and second information about what kind of file type can be executed by the multimedia resources and priority; and a control unit configured to detect the file type of a content file to be executed, and determine the processing module corresponding to the first information by comparing the second information stored in the resource table and the detected file type.

According to another aspect of the invention, there is provided a mobile terminal including: a storage configured to store a data file including a content data and attribute information indicating a coding type of the content data; a plurality of decoding modules configured to execute a decoding of the content data, each having different function from each other; a table configured to store the plurality of information indicating decoding units and an attribute information regarding the plurality of decoding modules; and a selecting unit configured to select first decoding module from the plurality of decoding modules which decodes the content in reference to the table when a request for decoding the content is received, and select second decoding module from the plurality of decoding modules when the first decoding module is not available for decoding the content.

According to stile another aspect of the invention, there is provided a mobile terminal including: a storage configured to store a multimedia data containing either one of a still image data and a moving image data and attribute information indicating coding type of the multimedia data; a plurality of decoding modules configured to execute a decoding of the multimedia data each having different function; a table configured to store the plurality of decoding modules and the attribute information capable of decoding which are corresponding with each other; and a selecting unit configured to select first decoding module which decodes the multimedia data in reference to the table when a request for decoding the multimedia data is received, and select second decoding module when the selected decoding module is processing to decode the multimedia data contained in another filed data.

BRIEF DESCRIPTION OF THE DRAWINGS

In the accompanying drawings:

FIG. 1 is a function block diagram of a portable terminal according to an embodiment of the invention;

FIGS. 2A, 2B, and 2C are optimum resource selecting tables of the portable terminal according to the embodiment;

FIGS. 3A and 3B are other optimum resource selecting tables of the portable terminal according to the embodiment;

FIG. 5 is a sequence diagram among respective blocks of the portable terminal according to the embodiment (without contention);

FIG. 6 is a sequence diagram among respective blocks of the portable terminal according to the embodiment (with contention); and FIG. 7 is other sequence diagram among respective blocks of the portable terminal according to the embodiment.

DETAILED DESCRIPTION OF THE INVENTION

Figure 4:
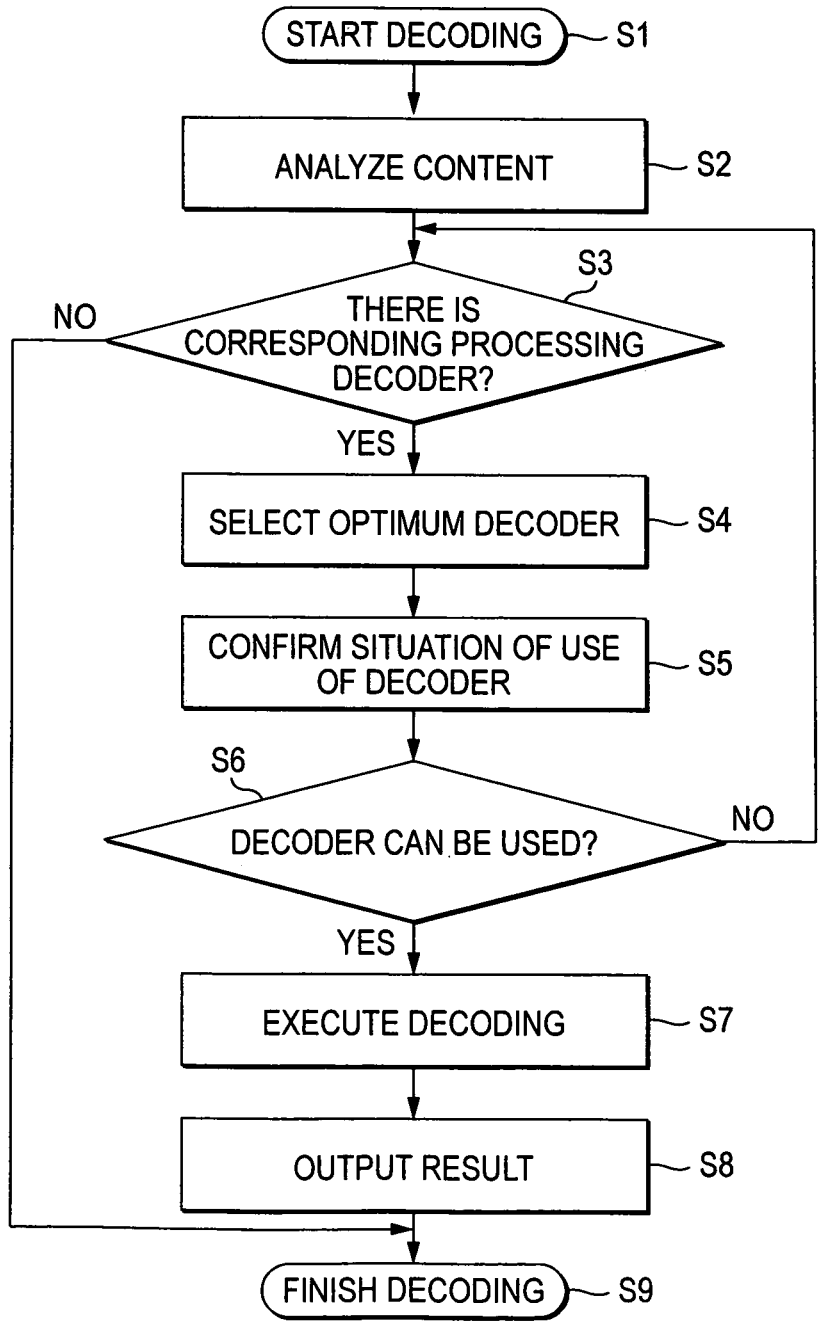
FIG. 4 is an operation flowchart of a still image control unit of the portable terminal according to the embodiment.

FIG. 1 is a block diagram showing a part of a mobile terminal 100 according to an embodiment of the invention. The mobile terminal 100, such as a cellular phone and a PDA, is provided with application processing module 1, multimedia control module 5, multimedia resource 12 including software resource 12-a and hardware resource 12-b, an image file storage 16, an optimum resource selecting table 17 and the like. The application module 1, the multimedia control module 5, and the software resource 12-b are the functions realized by software, and these functions are executed by a processing unit such as a CPU.

The application module 1 (upper layer) includes a still image application 2 for encoding and decoding the still image, a moving picture application 3 for encoding and decoding the moving picture, and a terrestrial digital broadcasting application 4 decoding and reproducing the TV programs contained in a received terrestrial digital broadcasting as shown in FIG. 1.

The multimedia control module 5 (middle layer) includes a still image control module 6, a moving picture control module 10, and a terrestrial digital broadcasting control module 11 as shown in FIG. 1. The still image control module 6, the moving picture control module 10, and the terrestrial digital broadcasting control module 11 include a content analyzing function 7, a resource selecting function 8, and a multimedia execution control function 9 respectively.

The multimedia resource 12 includes the software resource 12-a and the hardware resource 12-b as shown in FIG. 1. As described above, the software resource 12-a is realized by the software. On the other hand, the hardware resource 12-b is realized by a DPS (Digital Signal Processor) and an IC chip. The software resource 12-a includes a JPEG codec function 13, a PNG codec function 14, and the like, and the hardware resource 12-b includes a multimedia chip 15, and the like.

The still image application 2 executes processings regarding taking a photograph, displaying of still image data, management of still image data, and the like. The moving picture application 3 executes processings regarding video shooting, management of moving picture data, and the like. Further, the terrestrial digital broadcasting application 4 executes processings regarding decoding and reproducing a terrestrial digital broadcasting.

The operation of the still image control module 6, the moving picture control module 10, and the terrestrial digital broadcasting control module 11 will be described later in details with reference to FIG. 4.

The JPEG codec function 13 executes encoding/decoding processing on still image data according to the JPEG method, and the PNG (Portable Network Graphics) codec function 14 executes encoding/decoding processing on still image data according to the PNG method.

The multimedia chip 15 is provided with a plurality of kinds of codecs and includes the JPEG codec for a still image, and MPEG4 codec for a moving picture and/or a H.264 codec and the like.

The image file storage 16 stores contents in a coded form according to at least one of various coding (compression) methods, and, in the image file storage 16, the contents are stored with its header containing a plurality of parameters and its extension. The extension indicates the kind of codec method used for encoding the content.

Next, the optimum resource selecting table 17 will be explained with reference to FIGS. 2A to 2C.

FIG. 2A shows items of the optimum resource selecting table 17. The table 17 includes a file type (codec type) of image contents, resource type, and information showing whether the resource is executable the file type. Also, if multiple resources can execute one file type, the information includes priority specifying execution sequence. In this case, the resource is represented by ID number. In the table 17, a circle symbol means executable state.

For an image content with file type indicating JPEG (extension is '.jpg'), the JPEG codec function 13 and the multimedia chip 15 can execute this image content, and it is represented that the multimedia chip 15 is prior to the JPEG coded function 13 in the table 17. The priority above is determined based on resources' performance shown in FIG. 2B.

For an image content with file type indicating PNG (extension is '.png'), only the PNG codec function 14 can execute this image content as shown in FIG. 2A. For an image content with file type indicating moving picture (extension is '.3gp'), only the multimedia chip 15 can execute this image content as shown in FIG. 2A. For an image content with file type indicating terrestrial digital broadcasting data (extension is '.ts'), only the multimedia chip 15 can execute this image content as shown in FIG. 2A.

FIG. 2B is a view for explaining comparison of performances of the JPEG codec function 13 and the multimedia chip 15 for the image content according to JPEG (extender is '.jpeg'), for example, a designer of the mobile terminal 100 determines priorities between the JPEG codec function 13 and the multimedia chip 15 corresponding to JPEG method in light of processing speed and amount of memory to be used for execution obtained from specifications regarding the JPEG coded function 13 and the multimedia chip 15, and/or experiments.

As shown in FIG. 2B, according to the JPEG codec function 13, the processing speed is normal, amount of memory to be used for execution is large. According to the multimedia chip 15, the processing speed is fast and the amount of memory to be used for execution is small. Then, the designer determines that the priority of the multimedia chip 15 is first, and that the priority of the JPEG codec function 13 is second. Consequently, as shown in FIG. 2A, the priorities along with circle symbols are listed in the optimum resource selecting table 17.

FIG. 2C is another example showing performances. When compared with both of the JPEG codec function 13 and the multimedia chip 15, the JPEG codec function 13 is excellent in the CPU performance and the data transmitting speed and the processing speed is faster than those of the multimedia chip 15. Further, although the used amount of memory used by the JPEG codec function 13 is large, the used amount of memory does not constitute a risk since the CPU system is provided with the sufficient amount of memory and the determination is carried out by emphasizing only the processing speed. Then, the designer determines that the priority is the first in the JPEG codec function 13, and that the priority is the second in the multimedia chip 15. As shown in FIG. 2C, the priorities along with the circle symbols are listed in the optimum resource selecting table 17. In this example, the priorities for JPEG set in the optimum resource selecting table 17 shown in FIG. 2A go across.

FIGS. 3A and 3B illustrates views for explaining other optimum resource selecting table 17 stored in a mobile terminal according to the embodiment. A difference from FIGS. 2A to 2C resides in that a color format type that is additional information to the codec type. For example, JPEG is divided into two types according to the color format types. An explanation will be given by describing the JPEG method.

There are two kinds of a gray image and a color image in the color format, and there is a case in which the both functions are not necessarily provided to all of resources according to the JPEG method.

FIG. 3A shows items of the optimum resource selecting table 17. Although the file type is JPEG (extension is '.jpg'), there are a gray image and a color image in the color format of the JPEG method, for an image content with the gray image in color format, only the JPEG codec function 13 can execute this image content. The status that the JPEG codec function 13 can execute the image content is represented by the circle symbol as shown in FIG. 3A. This is the case in which the multimedia chip 15 is not provided with a function according to the gray image.

For an image content with the color image in color format, the JPEG codec function 13 and the multimedia chip 15 can execute this image content. The JPEG codec function 13 and the multimedia chip 15 are represented by circle symbols.

With regard to determination of the priorities, this is similar to that of FIGS. 2A, 2B, 2C, therefore an explanation thereof will be omitted here.

FIG. 2B is a view for explaining a constitution of a file header of a JPEG file (extension is '.jpg'). In the constitution of the file header, notation SOI designates an image start code, notation EOI designates an image end code, notation SOFO designates a frame start code, and notation Nf designates number of components in frame, respectively.

The still image control module 6 can determine whether the color format is the gray image or the color image by referring to Nf of the file header of the image content. Specifically, 1 is set to Nf in the case of the gray image and 3 is set to Nf in the case of the color image, respectively.

FIG. 4 is a flowchart showing still image processing executed in the mobile terminal according to the embodiment, in which a JPEG decoding processing is described as an example. The still image application 2 requests the still image control module 6 for decoding a JPEG file stored in the image file storage 16 (step S1). The still image control module 6, responding to the request, analyzes the header of the designated JPEG file for the decode request and recognizes that the file type is JPEG (extension is '.jpg') (step S2).

Next, the still image control module 6 checks the optimum resource selecting table 17 shown in FIG. 2A and confirms whether the resource having the encoding/decoding function corresponding to the JPEG (extension is '.jpg') is present (step S3). In the example of FIG. 2A, it is confirmed that there are the JPEG codec function 13 with second priority and the multimedia chip 15 with first priority.

Further, the multimedia chip 15 having the first priority is selected (step S4). Further, a situation is confirmed whether the multimedia chip 15 is brought into a usable state (step S5). In the case of the usable state ('YES' at step S6), decoding is executed by the multimedia chip 15 (step S7).

Further, although an explanation has been given such that at step 5, it is asked to the multimedia chip 15 whether the multimedia chip 15 is brought into the usable state, the embodiment is not limited thereto but, for example, when a table for controlling a situation of using the JPEG codec function 13, the PNG codec function 14, the multimedia chip 15 and the like of the multimedia resource 12 for the respective resources is provided, and the table is updated at each time when selecting resources executed by the still image control module 6, the moving picture control module 10, and the terrestrial digital broadcasting module 11 of the multimedia control module 5, the multimedia control module 5 can confirm the situation of using the resources by referring to the table without asking the resources.

Further, a result of finishing the processings is outputted to the still image application 2 (step S8) and the decoding processing is finished (step S9).

At step S6, when the multimedia chip 15 having the first priority is being used already and is not usable ('NO' at step S6), the operation returns to step S3. Further, it is confirmed whether other resource having the encoding/decoding function is present except the multimedia chip 15 (step S3), it is confirmed that the JPEG codec function 13 having the second priority is confirmed ('YES' at step S3), and the JPEG codec function 13 is selected (step S4).

Further, the situation of the JPEG codec function 13 is confirmed (steps S5, S6), the decoding is executed by the JPEG codec function 13 (step S7).

When there is not the corresponding encoding/decoding function at step S3 ('NO' at step S3), the decoding processing is canceled (step S9).

Further, an explanation will be given of a case of FIG. 3A as the optimum resource selecting table 17. In that case, an image content is analyzed by analyzing a header of the designated JPEG file, it is confirmed that the file type is JPEG (extension is '.jpg') is recognized and the color format is recognized (step S2).

It may be confirmed whether the resource having the encoding/decoding function corresponding to the color format is present (step S3). When the color format is the gray image, only the JPEG codec function 13 is confirmed (step S3). When the color format is the color image, the JPEG codec function 13 (the second priority) and the multimedia chip 15 (the first priority) are confirmed (step S3). The same goes at step S4 and thereafter and an explanation thereof will be omitted.

FIG. 5 is a sequence diagram among respective blocks of a mobile terminal according to the embodiment. This is an example of a case in which collision of multimedia resources is not brought about in decoding JPEG. The optimum resource selecting table 17 is constituted by a case of FIG. 2A.

The still image application 2 requests a decoding of the JPEG file stored in the image file storage 16 to the still image control module 6.

The still image control module 6 analyzes the image content in accordance with the flowchart of FIG. 4 and recognizes that the file type is JPEG (extension is '.jpg'). Further, it is confirmed that the JPEG codec function 13 (the second priority) and the multimedia chip 15 (the first priority) are present as decoders and the multimedia chip 15 is selected as an optimum because the multimedia chip 15 is assigned the first priority.

Subsequently, the still image control module 6 confirms the situation of the multimedia chip 15 and acquires information showing that the multimedia chip 15 is available since the decoder is not being used. Further, the decoding processing is executed by the multimedia chip 15.

FIG. 6 shows a sequence diagram among respective blocks of a mobile terminal according to an embodiment of the invention. This is an example of a case of bringing about a collision of multimedia resources in decoding JPEG. The optimum resource selecting table 17 constitutes the case of FIG. 2A.

It is assumed that the multimedia chip 15 is executing the decoding processing of a moving picture responding to a request, which is issued by the moving picture application 3, the moving picture control module 3 for decoding another moving image. An explanation will be given of a case in which decoding of the still image file such as a JPEG file is requested from the still image application 2 to the still image control module 6 when the decoding processing of the moving picture is being executed.

The still image control module 6 analyzes an image content in accordance with the flowchart explained in FIG. 4, recognizes that the file type is JPEG (extension is '.jpg'). Further, it is confirmed that there are the JPEG codec function 13 (the second priority) and the multimedia chip 15 (the first priority) as the decoders, and the multimedia chip 15 is selected as an optimum because the multimedia chip 15 is assigned the first priority.

Subsequently, the still image control module 6 confirms the situation for the multimedia chip 15. At this occasion, the multimedia chip 15 is being used by executing to decode the moving picture of the moving picture control module 10 and the still image control module 6 acquires information showing that the multimedia chip 15 is not available.

The still image control module 6 confirms again whether a resource having the decoding function of JPEG method is present other than the multimedia chip 15 and recognizes that the JPEG codec function 13 with the second priority can be used to decode the still image file. Further, the situation of the JPEG codec function 13 is confirmed and information showing that the JPEG codec function 13 is available, then decoding is executed by the JPEG codec function 13.

Further, in a case in which the optimum resource selecting table 17 is as shown by FIG. 3A, when the color format is the color image, there are a plurality of resources having the codec processing function, which are the JPEG codec function 13 with the second priority and the multimedia chip 15 with the first priority. Also in this case, even when decoding processings of the color format are contended, the optimum resource is selected.

In this way, the optimum multimedia chip resource can be selected in accordance with a situation of without contention or with contention.

FIG. 7 is other sequence diagram among respective blocks of a mobile terminal according to an embodiment of the invention. A difference from FIG. 6 resides in an example in which the multimedia chip 15 is a chip capable of decoding the still image according to JPEG method and decoding the moving picture at the same time.

It is assumed that the multimedia chip 15 is executing the decoding processing of a moving picture responding to a request, which is issued by the moving picture application 3, the moving picture control module 3 for decoding another moving image. An explanation will be given of a case in which decoding of the still image file according to the JPEG method is requested from the still image application 2 to the still image control module 6 when the decoding processing of the moving picture is being executed.

The still image control module 6 analyzes the content in accordance with the flowchart of FIG. 4 and recognizes that the file type is JPEG (extension is '.jpg'). Further, it is confirmed that the JPEG codec function 13 with the second priority and the multimedia chip 15 with the first priority are present and the multimedia chip 15 is selected as an optimum because the multimedia chip 15 is assigned the first priority.

Subsequently, the still image control module 6 confirms the situation for the multimedia chip 15. At this occasion, the multimedia chip 15 is being used already by executing to decode the moving picture of the moving picture control module 10, however, the multimedia chip 15 is a chip capable of decoding the still image according to the JPEG method even if the multimedia chip 15 is decoding the moving picture, and therefore, the still image control module 6 acquires information showing that the multimedia chip 15 is available. Therefore, the still image control module 6 executes decoding by the multimedia chip 15.

Further, although an explanation has been given mainly of the still image control module 6, also the moving picture control module 10 and the ground digital control module 11 can similarly execute processings of executing to analyze the content, select the resource and control the multimedia.

Further, although an explanation has been given of decoding processing of an image content, the invention may be applied to a multimedia resource for executing other processing of multimedia.

According to the above-mentioned embodiment, in a module terminal mounted with multi-applications of a still image, a moving picture, a terrestrial digital broadcasting and the like, an optimum multimedia resource can be selected for the multi-applications while avoiding collision of a plurality of access to the multimedia resource.

What is claimed is:

1. A mobile terminal comprising:
 a content file storage configured to store a plurality of contents and file types corresponding to the contents respectively;
 two multimedia resources, including a software codec and a hardware multimedia chip, configured to execute processing according to coding methods respectively;
 a resource table configured to store first information identifying the multimedia resources and second information about which file types can be executed by the software codec and the hardware multimedia chip to enable the selection of the appropriate one of the software codec and the hardware multimedia chip for a given file type, the second information including priorities between the two multimedia resources which are predetermined in light of a processing speed and an amount of memory used for execution of each of the two multimedia resources; and
 a control unit configured to detect the file type of a content file to be executed and determine the multimedia resource corresponding to the first information by comparing the second information stored in the resource table and the file type detected by the control unit, the control unit further configured to determine the multimedia resource corresponding to the first information based on the priorities included in the second information.

2. The mobile terminal according to claim 1, wherein the content is an image content, and
 wherein the file type detected by the control unit is detected using at least one of a file extension and a color format representing a kind of an image codec type.

3. The mobile terminal according to claim 1, wherein the control unit determines the multimedia resource with higher priority if multiple multimedia resources are obtained corresponding to the first information by comparing the second information stored in the resource table and the file type detected by the control unit.

4. The mobile terminal according to claim 1, wherein the multimedia chip includes a plurality of kinds of codecs.

5. A mobile terminal comprising:
 a storage configured to store a data file including a content data and attribute information indicating a coding type of the content data;
 two decoding modules, including a software codec and a hardware multimedia chip, configured to execute a decoding of the content data, each having a different function from each other;
 a table configured to store first information identifying the two decoding modules and second information about which file types can be executed by the software codec and the hardware multimedia chip to enable the selection of the appropriate one of the software codec and the hardware multimedia chip for a given file type, the second information including priorities between the two decoding modules which are predetermined in light of a processing speed and an amount of memory used for execution of each of the two decoding modules; and
 a selecting unit configured to select a first decoding module from the decoding modules which decodes the content data in reference to the table when a request for decoding the content data is received, and select a second decoding module from the decoding modules when the first decoding module is not available for decoding the content data, the selecting unit further configured to select the first decoding module based on the priorities included in the second information.

6. The mobile terminal according to claim 5, wherein the priorities between the two decoding modules indicate which of the two decoding modules has a higher priority where the two decoding modules are available for the same codec type.

7. The mobile terminal according to claim 5, wherein the attribute information indicates the codec type which is used to encode the content data.

8. The mobile terminal according to claim 5, wherein the multimedia chip includes a JPEG codec, a MPEG4 codec, an H.264 codec, or some combination thereof.

9. The mobile terminal according to claim 8, wherein the software codec comprises a JPEC codec, a PNG codec, or some combination thereof.

10. A mobile terminal comprising:
a storage configured to store a multimedia data containing either one of a still image data and a moving image data and attribute information indicating coding type of the multimedia data;
two decoding modules, including a software codec and a hardware multimedia chip, configured to execute a decoding of the multimedia data each having a different function;
a table configured to store first information identifying the two decoding modules and second information about which file types can be executed by the software codec and the hardware multimedia chip to enable the selection of the appropriate one of the software codec and the hardware multimedia chip for a given file type, the second information including priorities between the two decoding modules which are predetermined in light of a processing speed and an amount of memory used for execution of each of the two decoding modules; and
a selecting unit configured to select a first decoding module which decodes the multimedia data in reference to the table when a request for decoding the multimedia data is received, and select a second decoding module when the first decoding module is processing to decode the multimedia data contained in another data file, the selecting unit further configured to select the first decoding module based on the priorities included in the second information.

11. The mobile terminal according to claim 10, wherein the priorities between the two decoding modules indicate which of the two decoding modules has a higher priority where the two decoding modules are available for the same codec type.

12. The mobile terminal according to claim 10, wherein the attribute information indicates the codec type which is used to encode the multimedia data.

13. The mobile terminal according to claim 10, wherein the software codec comprises a JPEC codec, a PNG codec, or some combination thereof.

* * * * *